US005484477A

United States Patent [19]

George et al.

[11] Patent Number: 5,484,477
[45] Date of Patent: Jan. 16, 1996

[54] COATING COMPOSITION, GRANULES COATED WITH SAME, AND METHOD OF REDUCING DUST GENERATION

[75] Inventors: Billy L. George; Stefan A. Babirad, both of Hudson, Wis.; Delmon H. Penny, Little Rock, Ark.

[73] Assignee: Minnesota Mining and Manufacturing Company, St. Paul, Minn.

[21] Appl. No.: 319,611

[22] Filed: Oct. 7, 1994

Related U.S. Application Data

[62] Division of Ser. No. 26,441, Mar. 4, 1993, Pat. No. 5,362,566.

[51] Int. Cl.$^6$ .......................... C09K 3/22; C09D 191/00; C09D 7/12; C09C 3/08
[52] U.S. Cl. .................. 106/499; 106/239; 106/285; 106/287.35; 106/500; 106/506; 428/144; 428/323; 428/329; 428/403; 428/404; 428/407; 428/497
[58] Field of Search ...................... 428/144, 323, 428/329, 403, 404, 407, 497, 141; 106/239, 285, 287.35, 499, 500, 506

[56] References Cited

U.S. PATENT DOCUMENTS

| | | | |
|---|---|---|---|
| 2,118,898 | 5/1938 | Price | 428/145 |
| 2,273,827 | 2/1942 | Beasley | 424/404 |
| 2,591,149 | 4/1952 | Basking | 427/219 |
| 2,595,465 | 5/1952 | Keene et al. | 428/145 |
| 2,614,051 | 10/1952 | Buzzell et al. | 428/145 |
| 2,927,045 | 3/1960 | Lodge et al. | 428/405 |
| 2,981,635 | 4/1961 | Lodge | 428/404 |
| 2,981,636 | 4/1961 | Lodge et al. | 428/404 |
| 3,265,765 | 8/1966 | Holden et al. | 525/271 |
| 3,397,073 | 8/1968 | Fehner | 428/405 |
| 3,752,696 | 8/1973 | Beyard et al. | 428/407 |
| 3,888,684 | 6/1975 | Little | 106/18.35 |
| 3,917,607 | 11/1975 | Crossland et al. | 524/478 |
| 4,032,491 | 6/1977 | Schoenke | 524/68 |
| 4,359,505 | 11/1982 | Joedicke | 428/404 |
| 4,378,408 | 3/1983 | Joedicke | 428/403 |
| 4,452,961 | 6/1984 | Koerner et al. | 428/447 |
| 4,486,476 | 12/1984 | Fritsch et al. | 428/447 |
| 4,537,595 | 8/1985 | Gruning et al. | 8/115.6 |
| 4,588,634 | 5/1986 | Pagen et al. | 428/283 |
| 4,668,315 | 5/1987 | Brady et al. | 156/71 |
| 4,781,950 | 11/1988 | Giesing et al. | 428/447 |
| 4,824,880 | 4/1989 | Algrim et al. | 521/62 |
| 4,871,376 | 10/1989 | DeWald | 51/298 |
| 4,882,384 | 11/1989 | Willis et al. | 525/105 |
| 4,895,754 | 1/1990 | Graham et al. | 428/289 |
| 4,990,278 | 2/1991 | Wyeth | 252/70 |
| 5,011,726 | 4/1991 | Chich et al. | 428/141 |
| 5,035,748 | 7/1991 | Burow et al. | 106/499 |
| 5,059,426 | 10/1991 | Chiang et al. | 424/449 |
| 5,069,909 | 12/1991 | Sharma et al. | 424/449 |
| 5,086,103 | 2/1992 | Blizzard et al. | 524/188 |
| 5,240,760 | 8/1993 | George et al. | 428/145 |
| 5,286,544 | 2/1994 | Graham | 428/144 |
| 5,362,566 | 11/1994 | George et al. | 428/403 |

OTHER PUBLICATIONS

E. Schamberg, *Adhesion*, V. 29(11), pp. 20, 23–27 (1985) (partial translation) no month avail.

Sales Literature, "Kraton Thermoplastic Rubber," pp. 1–13, 16, Shell Oil Co. Sales Office, Oak Brook, Ill. no date avail.

*Primary Examiner*—David Brunsman
*Attorney, Agent, or Firm*—Gary L. Griswold; Walter N. Kirn; Daniel R. Pastirik

[57] ABSTRACT

A coatable composition suitable for reducing dust generation during processing of granular materials consists essentially of a tackifier, an organic oil, and an adhesion agent, the tackifier consisting essentially of an organic material having a glass transition temperature of no less than about 120° C. and a diluent present in sufficient amount to give the tackifier a kinematic viscosity ranging from about 3,000 to about 5,000 centistokes at 100° C. The tackifier is preferably present in the composition at about 0.5 to about 2.0 weight percent of the total weight of the composition, and the adhesion agent is preferably present at about 0.5 to about 5.0 weight percent of the total weight of the composition, with the balance being organic oil. Granular materials having coatings of the composition (with or without the adhesion agent) are presented, as well as methods of reducing dust generation during processing and/or transport of granular materials and methods of making organic oil-coated granular materials.

16 Claims, No Drawings

COATING COMPOSITION, GRANULES COATED WITH SAME, AND METHOD OF REDUCING DUST GENERATION

This is a division of application Ser. No. 08/026,441 filed Mar. 4, 1993 now U.S. Pat. No. 5,362,566.

BACKGROUND OF THE INVENTION

1. Field of the Invention

The present invention relates to compositions consisting essentially of an organic oil and a tackifier (which itself includes a diluent), the compositions having an increased propensity to reduce dust generation from granular materials during processing of such materials compared with organic oils used alone.

2. Description of Related Art

Roofing granules, both natural and artificially color-coated, find extremely wide use in roofing and siding materials. Important applications are in granular surfaced bituminous roll roofing and asphalt shingles. The granules, which are partially embedded in one surface of asphalt-impregnated and/or asphalt-coated fiber sheet material, form a coating to provide an inherently weather-resistant, fire-resistant, and decorative exterior surface. "Weather-resistant" as used herein includes ultraviolet (UV) radiation-resistant.

Roofing granules generally consist of crushed and screened inorganic substrate granules. The substrate granules are typically coated with a ceramic coating which may include a pigment. In carrying out these coating methods, the pigment is uniformly applied to the substrate granule surface with a soluble silicate solution. The coating is usually applied in the form of a dispersion of a soluble silicate and a clay which partially or completely react together in the presence of heat to form an insolubilized ceramic coating.

Dust generation during processing and handling of inorganic granules such as roofing granules presents an environmental (air quality) issue that must be dealt with by the manufacturer and the customer, most notably at transfer points when unloading granules from shipping containers, such as trucks and railhoppers and the like, to storage tanks. Airborne particles of substrate and coating (particles range in size from 0.5 to about 30 micrometers) are typically generated during processing and handling.

Various approaches have been taken to reduce dust generation, all having certain disadvantages:

a) dust generated from white roofing granules may be reduced by reducing the amount of borax in the ceramic coating; however, this increases titanium dioxide pigment costs;

b) another alternative to reduce dust generation is to use an organic oil, such as slate oil, coated onto the granules as a post-treatment coating. Increased oil usage however may decrease adhesion of roofing granules to bituminous shingles. Oil can also increase color difference between color of the originally oiled granular material and color after a given period of time. This is an especially important consideration in the manufacture of roofing granules.

c) silicone oils and other adhesion agents added to the organic oil may improve adhesion of granules to asphalt-based shingles, as taught in assignee's U.S. Pat. Nos. 5,240,760 and 5,286,544; however, the problems associated with use of oil alluded to above remain;

d) magnesium chloride, applied in appropriate amounts, is touted as having the ability to reduce dust generation from inorganic granules during processing of the granules, as disclosed in assignee's U.S. Pat. No. 5,368,936; however, the alkalinity of magnesium chloride-treated granules must be closely scrutinized.

Given the above, it would be advantageous and an advancement in the art if the level of dust generated during processing and handling of granular materials such as roofing granules could be controlled while avoiding the disadvantages of prior approaches to the problem.

SUMMARY OF THE INVENTION

In accordance with the present invention, a coatable composition is presented which has as one primary utility the ability to reduce or eliminate dust generation during processing granular materials while at the same time reducing the amount of oil required. As used herein the term "coatable" means that the composition viscosity is such as to allow the composition to be sprayed or poured onto granular materials.

The coatable compositions of the invention consist essentially of:

a) an organic oil;

b) an adhesion agent (such as a silicone oil); and c) a tackifier, the tackifier consisting essentially of an organic material having a glass transition temperature of no less than about 120° C. (more preferably no less than about 150° C.) and a diluent present in sufficient amount to give the tackifier a kinematic viscosity ranging from about 3,000 to about 5,000 centistokes at 100° C.

As used herein "kinematic viscosity" has its generally accepted meaning, the absolute viscosity (sometimes referred to as the dynamic viscosity) of the fluid divided by its mass density. Preferred diluents are light-colored naphthenic oils.

The amount of tackifier in the inventive compositions preferably ranges from about 0.5 to about 2.0 weight percent, more preferably from about 0.5 to about 1.0 weight percent of the total weight of the composition. The amount of adhesion agent preferably ranges from about 0.5 to about 5.0 weight percent of the composition weight, the balance of the composition being organic oil.

The term "consisting essentially of", when used in reference to the inventive compositions, means that the compositions of the invention may include impurities and additives which do not detract from the ability of the compositions to reduce dust generation. When the term is used in reference to the tackifier component (typically a pre-formulated additive), the term means that the tackifier may include impurities and additives which do not detract from the ability of the tackifier to increase the viscosity of the organic oil.

Preferably, the organic oil is a mineral oil (i.e., a hydrocarbon oil derived from petroleum, such as paraffin oils, naphthenic oils, and the like, or a coal oil or rock oil). One particularly preferred mineral oil is slate oil. Another particularly preferred mineral oil is seneca oil. These oils will generally have a kinematic viscosity ranging from about 100 to about 300 centistokes at 100° C., more preferably ranging from about 150 to about 250 centistokes.

The organic material component of the tackifier is preferably selected from organic monomers, oligomers or polymers having a glass transition temperature ($T_g$) no less than about 120° C., more preferably no less than about 150° C.

Two categories of preferred organic polymeric materials are polyalkylene resins and polycycloalkene resins, the latter group including aromatic organic resins.

Preferred organic materials which are polyalkylene resins include polybutene resins, dipentene resins, terpolymers of ethene, 1-propene, and 1,4-hexadiene, and the like.

Preferred organic materials which are polycycloalkene resins include phenol-aldehyde resins; polyterpene resins; rosins, including rosin acids and esters, and hydrogenated rosins; polyethylene rosin esters; phenolic polyterpene resins; limonene resins; pinene resins such as alpha and beta pinene resins; styrenated terpene resins, and the like.

One particularly preferred tackifier consists of the terpolymer of ethene, 1-propene, and 1,4-hexadiene adjusted to the above preferred kinematic viscosity with a light-colored naphthenic oil, such as the naphthenic oil known under the trade designation "HS-500", available from Cross Oil & Refining Co., Smackover, Ark.

The present invention also provides a coated granular material which has a dust-reducing coating (20–100 micrometers thick) of the composition of the invention applied as a post-treatment, either with or without the adhesion agent component of the composition. An adhesion agent is preferably used if the granular materials are adhered to an extended surface, such as in a roofing shingle construction. In situations where the coated granular material is used without being attached to a surface, such as when the coated granular material is merely used as a decorative material in a garden or flower bed, it is preferred that an adhesion agent not be used.

The coated granular materials of the invention (with or without adhesion agent) preferably have present thereon the composition of the invention in quantities sufficient to give the coated granular material a dust generation value of not more than 500 particles per cubic centimeter, more preferably not more than 100 particles per cubic centimeter. A test which defines "dust generation value" is given in the Test Methods section. The amount of coating used in the inventive coated granular materials typically and preferably ranges from about 0.5 to about 10 grams per kilogram of base granules, more preferably about 2.5 to about 4 grams per kilogram of base granules.

Another aspect of the invention is a method of making organic oil-coated coated granular materials comprising the steps of:

a) providing a base granule; and b) coating the base granule with the composition of the invention, preferably to a coating weight ranging from about 0.5 to about 10 grams, more preferably about 2.5 grams to about 4.0 grams of composition per kilogram of base granules.

A method wherein the composition is devoid of adhesion agent is also deemed within the invention. One advantage of the method of making the organic oil-coated granular materials of the invention is that when using the above-described inventive compositions, the compositions do not gel (increase in kinematic viscosity over 500 centistokes measured at 100° C.) in the containers in which the composition is held, as opposed to presently known post-treatment compositions.

Another aspect of the invention is a method of reducing dust generation during processing of base granules, the method comprising treating granular materials with the composition of the invention. Preferably, as previously stated, the amount of the composition applied to the base granules is at least about 0.5 grams per kilogram base granules, but no more than about 10 grams per kilogram base granules.

Regarding this latter aspect of the invention, it has been discovered that the location in the process where the composition is applied to the base granules is important to optimize the reduction in dust generation from base granules. In particular, in processes wherein silicate/clay solution-coated base granules are fired in a kiln (for example, a commonly known rotating kiln) to crystallize the coating to form a hard ceramic coating, the kiln-fired granules are typically transferred to a cooling means, such as a rotating water cooler, and then transported utilizing one or more transport means (for example horizontal and vertical conveyer belts) downstream of the cooling means to a final storage facility, such as a railhopper car or holding tank. It has been found that if equal amounts of composition of the invention are applied to the base granules materials while the base granules are being cooled in the cooling means to a temperature of about 110° C., and downstream at the transport means where the temperature of the granules has reached a temperature of about 80° C., as the percentage of tackifier in the composition increases the amount of dust generated significantly decreases. Surprisingly, however, if all of the composition is applied to the granules at the cooling means, there is no significant decrease in dust generation as the percentage of tackifier is increased from about 0.2 percent to about 1.0 percent, unless the quantity of the composition applied exceeds about 3 grams per kilogram of granules.

Preferred coated granular materials of the invention include inorganic base granules having a ceramic coating, the ceramic coating consisting essentially of the reaction product of an alkali metal silicate and an aluminosilicate (clay). Reduction in both the dust generated from base inorganic granules and the amount of organic oil used are significant, as seen in the Examples.

Further understanding of the advantages of the invention will be recognized by reading the Description of Preferred Embodiments and Examples which follow.

DESCRIPTION OF PREFERRED EMBODIMENTS

Tackifiers

As previously stated, "tackifiers" within the invention comprise an organic material combined with (preferably dispersed in) a diluent. It is preferred that the organic material comprise a thermally-stable, shear-stable polyolefin. The "tackiness" of the composition of the invention may be decreased by shear, thus mechanical shearing during blending and handling of the tackifier component and compositions of the invention should be avoided or minimized.

Organic materials particularly well suited for use in the tackifier have already been mentioned and include polybutene resins, dipentene resins, the terpolymer of ethene, 1-propene, and 1,4-hexadiene, and the like. Particularly preferred is the terpolymer of ethene, 1-propene, and 1,4-hexadiene.

A non-limiting list of other commercially available organic resins having glass transition temperature no less than about 120° C. which may be used as the organic material in tackifiers are those given in Table 1, wherein $T_g$ denotes the glass transition temperature, and $T_s$ denotes the softening temperature of the resin. The trade designation, type of resin, and resin manufacturer or supplier is also given in Table 1.

TABLE 1

ORGANIC RESINS USEFUL IN TACKIFIERS

| Resin Trade Designation | Tg °C. | Ts °C. | Resin Type | Mfr |
|---|---|---|---|---|
| Arkon P70 | 145 | 173 | Hydrogenated C9 | Arakawa |
| Arkon P90 | 154 | 181 | Hydrogenated C9 | Arakawa |
| Arkon P115 | 166 | 203 | Hydrogenated C9 | Arakawa |
| Arkon P125 | 171 | 208 | Hydrogenated C9 | Arakawa |
| Escorez 1102 | 154 | 189 | C5 Resin | Exxon |
| Escorez 1304 | 157 | 189 | C5 Resin | Exxon |
| Escorez 1310 | 156 | 186 | C5 Resin | Exxon |
| Escorez 1315 | 164 | 204 | C5 Resin | Exxon |
| Escorez 1580 | 148 | 179 | C5 Resin | Exxon |
| Escorez 2101 | 154 | 185 | Aliphatic/Aromatic | Exxon |
| Escorez 7105 | 163 | 196 | Hydrogenated C9 | Exxon |
| Escorez 7312 | 163 | 204 | Hydrogenated C9 | Exxon |
| Foral AX | 148 | 175 | Hyd Wood Rosin Acid | Hercules |
| Hercotac LA-95 | — | 187 | C5 Resin | Hercules |
| Hercotac RT-100 | 159 | 186 | C5 Resin | Hercules |
| Hercotac RT-1005 | 166 | 192 | C5 Resin | Hercules |
| Hercotac RT-115 | 169 | 194 | C5 Resin | Hercules |
| Hercotac RT-400 | 163 | 189 | C5 Resin | Hercules |
| Nevtac 99 | 163 | 189 | Polyterpene Resin | Neville |
| Permalyn 305 | 161 | 192 | PE Rosin Ester | Hercules |
| Permalyn 85 | 153 | 181 | PE Rosin Ester | Hercules |
| Piccofyn A-135 | 181 | 208 | Phenolic Polyterpene | Hercules |
| Piccofyn T-125 | 175 | 203 | Phenolic-mod Terpene | Hercules |
| Piccolyte A-115 | 170 | 198 | Alpha Pinene | Hercules |
| Piccolyte A-125 | 177 | 203 | Alpha Pinene | Hercules |
| Piccolyte A-135 | 183 | 208 | Alpha Pinene | Hercules |
| Piccolyte C-115 | 166 | 198 | d-Limonene Resin | Hercules |
| Piccolyte D-115 | 171 | 198 | Dipentene Resin | Hercules |
| Piccolyte HM-85 | — | 181 | Styrenated Terpene | Hercules |
| Piccolyte HM-105 | 164 | 192 | Pinene Resin | Hercules |
| Piccolyte S-115 | 170 | 198 | Beta Pinene | Hercules |
| Piccotac 95 | 157 | 187 | Aliphatic C5 | Hercules |
| Quintone A-100 | 158 | 189 | C5 Resin | Nippon-Zeon |
| Quintone B-170 | 143 | 173 | C5 Resin | Nippon-Zeon |
| Quintone C-100 | 157 | 187 | C5 Resin | Nippon-Zeon |
| Quintone D-100 | 159 | 189 | C5 Resin | Nippon-Zeon |
| Quintone M-100 | 158 | 187 | C5 Resin | Nippon-Zeon |
| Quintone N-180 | 150 | 179 | C5 Resin | Nippon-Zeon |
| Quintone U-185 | 153 | 181 | C5 Resin | Nippon-Zeon |
| Regalite 355 | 159 | 192 | Hyd. Rosin Ester | Hercules |
| Regalite 7070 | 145 | 173 | Hyd Aromatic | Hercules |
| Res D-2054 | 169 | 197 | Styrenated Terpene | Hercules |
| Wingtack 115 | 171 | 203 | C5 Resin | Goodyear |
| Wingtack 86 | 161 | 182 | Styrenated C5-Terpene | Goodyear |
| Wingtack Plus | 157 | 204 | C5 Resin | Goodyear |
| Wingtack 95 | 161 | 187 | C5 Resin | Goodyear |
| Zonarez A-100 | 164 | 193 | Alpha Pinene | Arizona |
| Zonarez A-135 | 186 | 209 | Alpha Pinene | Arizona |
| Zonatac 105 | 167 | 192 | Styrenated d-Limonene | Arizona |
| Zonatac 501 | 167 | 192 | Styrenated terpene | Arizona |
| VC Tack 100 | — | — | ethylene/propylene block copolymer | Complex Chemical |
| Adsee 775 | — | — | surfactant composition | Witco |

Diluents

Diluents may be any natural or synthetic material capable of providing the tackifier component with a kinematic viscosity within the desired range specified above. Diluents are preferably light-colored oils (color less than 4 as determined by American Society of Testing Materials ("ASTM") D 1500) such as light-colored naphthenic oils, although other oils capable of rendering the tackifier a kinematic viscosity varying from about 3,000 to about 5,000 at 100° C. may be used, such as coal oils, rock oils (such as slate oil and the like) and mineral oils (i.e., hydrocarbons derived from petroleum, such as aromatic, paraffinic and naphthenic oils). Naphthenic oils are preferred as they do not presently require hazard labelling during shipping. Preferred naphthenic oils have the characteristics designated in Table 2.

TABLE 2

Preferred Diluent Properties

| Property | ASTM Test No. | Preferred Range | More Preferred Range |
|---|---|---|---|
| Viscosity, cST @ 40° C. | D445 | 55–65 | 57–63 |
| Viscosity, cST @ 100° C. | D445 | 5–10 | 6–8 |
| Viscosity Index | — | 40–45 | 41–43 |
| Gravity, API | D287 | 17–23 | 18.5–22.0 |
| Gravity, Sp., @ 16° C. | D1250 | 0.90–0.95 | 0.93–0.94 |
| Weight, kg/liter | D1250 | 0.95–1.0 | 0.97–0.99 |
| Molecular weight | D2502 | 350–450 | 380–420 |
| Flash point, °C. | D92 | >175 | 185–200 |
| Color | D1500 | <4.0 | <3.0 |
| Pour Point, °C. | D97 | >−23 | >−25 |

When the diluent is mixed with the organic resin component to create a tackifier, the tackifier will preferably have a $T_g$ ranging from about −30° C. to about −50° C.

Organic Oils

Organic oils suitable for reducing dust generation may be any natural or synthetic oil that is compatible (or capable of being rendered compatible) with the base granules, the tackifier (both organic material and diluent), and any adhesion agent used. Typically and preferably the organic oil is a natural oil selected from the same materials described previously as suitable for the diluent component of the tackifier. Petroleum-derived oils are particularly well suited for use with base granules such as ceramic-coated slate granules, because they hamper dust formation and provide excellent coating of tackifier and adhesion agent on the granule surface. Of the petroleum-derived oils, paraffinic and naphthenic oils are preferred over aromatic oils because the former have a more favorable flash point. As previously stated for diluent oils, naphthenic oils are preferred over paraffinic oils for shipping reasons.

When the compositions of the invention are applied to ceramic-coated slate base granules, which are commonly used as roofing granules, the organic oil(s) employed should be present in an amount that permits an adequate quantity of granules to be sufficiently coated with a thin film of the composition of the invention, but not to such an extent that the adhesion of the granules to an asphalt surface of a shingle backing would be compromised. As the term is used herein, "thin film" means a coating that is less than about 25 micrometers; more preferably less than about 20 micrometers. Typically, the thin film would be greater than at least 5 micrometers. Preferably, the thin film coating is continuous over the base granule surface, but it can be, and usually is, discontinuous. It is preferred that at least 50 percent of the roofing granule surface be coated with the thin film.

Adhesion Agents

Although the inventive coated granular materials having a dust-reducing coating comprised of one of the compositions of the invention do not require that the coating composition have therein an adhesion agent (such as a silicone oil) to reduce dust generation, compositions consisting essentially of tackifier, organic oil, and an adhesion agent, in the proportions used herein, are especially advantageous when the coated granular material is to be adhered to a surface.

Silicone oils are typically used to promote the adhesion of roofing granules to asphalt-based substrates and to improve the stain resistance of the granules, and are therefore the preferred adhesion agents. Silicone oils are essentially chemically inert. Typical and preferred silicone oils are the organosiloxane silicone oils known under the trade designations "Tegosivin" HL15M7 and "Tegosivin" HL100, both available from Goldschmidt Chemical, Hopewell, Va. Other preferred silicone oils are described in E. Schamberg, *Adhesion*, v. 29(11), pp. 20, 23–27 (1985), as well as in U.S. Pat. Nos. 4,486,476; 4,452,961; 4,537,595; and 4,781,950.

Other adhesion agents that are suitable for use in the invention include the compositions known under the trade designations "R-20", "R-24", "R-27", "R-270", and "R-272" (Union Carbide Corporation, Danbury, Conn.); silicone resins "MK", "M-62" (Wacker-Chemi GMBA, Alemania, Germany); compositions known under the trade designations "Dri-Sil 73", "1107" and "477" (Dow Corning Corporation, Midland, Mich.); "SR-82" and "SM 2138" (available from General Electric, Schenectady, N.Y.); and oleic acid, available from Witco Chemical Corporation, Chicago, Ill. Combinations of these adhesion agents may be employed in the compositions of the invention.

The adhesion agent, when used on ceramic-coated roofing granules, is employed in the composition of the invention to an extent sufficient to promote granule adhesion to an asphalt-based shingle substrate. The amount of adhesion agent can vary depending on the composition of the organic oil, tackifier, and adhesion agent. Generally speaking, adhesion agents are employed at about 0.01 to 2.5 grams per kilogram of substrate granules ($5 \times 10^{-4}$ to 0.25 weight percent). In the case where TEGOSIVIN silicone oils are applied to ceramic-coated roofing granules, the adhesion agent is preferably applied to the roofing granules at about 0.25 to 0.5 gram per kilogram of base granules ($2.5 \times 10^{-1}$ to 0.05 weight percent), more preferably 0.05 to 0.15 gram per kilogram (0.005 to 0.015 weight percent).

Base Granules

Although the coatings of the invention have been discussed as being applied to roofing granules, as used herein the term "base granules" is used broadly and is intended to include organic and base particles having a diameter ranging from about 425 to about 1600 micrometers. Base granules smaller or larger than this can be used in roofing shingles provided they can be adhered to the shingle backing.

Preferred inorganic base granules for use in the invention are conventional and may be selected from any one of a rather wide class of relatively porous and weather resistant rock or minerals. Examples of relatively porous materials are trap rocks and slates. Examples of relatively non-porous rocks or minerals are argillite or greystone (such as the rock available in the large greystone deposits located north of Wausau, Wis.), greenstone, certain granites, and the like.

When the base granules have a ceramic coating, the preferred ceramic coatings are derived from the reaction of an aqueous alkali metal silicate, such as aqueous sodium silicate, and an aluminosilicate. Equivalent materials such as aqueous potassium silicate may also be used. The alkali metal silicate may be designated as $M_2O:SiO_2$, where M represents an alkali metal ion such as sodium ($Na^+$), potassium ($K^+$), mixtures of sodium and potassium ions, and the like. The weight ratio of $M_2O$ to $SiO_2$ preferably ranges from about 1.4:1 to about 3.75:1. Weight ratios of 2.75:1 and 3.22:1 are particularly preferred, depending on the color of the coated granular material to be produced, the former preferred when light colored granules are produced, while the latter is preferred when dark granules are desired.

The aluminosilicate is preferably a clay having the formula $Al_2Si_2O_5(OH)_4$. Another preferred clay is kaolin, $Al_2O_3 \cdot 2SiO_2 \cdot 2H_2O$, and its derivatives formed either by weathering (kaolinite), by moderate heating (dickite), or by hypogene processes (nakrite). The particle size of the clay is not critical to the invention, however, it is preferred that the clay contain not more than about 0.5 percent coarse particles (particles greater than about 0.002 mm in diameter). Commercially available and useful aluminosilicate clays for use in the present invention are the aluminosilicates known under the trade designations "Dover", from W. R. Grace Company, Mcintyre, Ga., and "Sno-brite", from Evans Clay Company, also of Mcintyre, Ga.

The coatable compositions of the invention may be applied to virgin or artificially colored base granules.

When it is desired to prepare artificially colored inorganic base granules, a precolored base granule may be treated with one of the above-described inventive compositions to reduce the dust generation from the resulting granules during processing and transport of the finished granules. Preferred precolored inorganic base granules include those known under the trade designations 3M Brand "5100" Series Roofing Granules, which are black kiln granules; brown kiln granules known under the trade designation 3M Brand "4100" Series Roofing Granules; and white kiln granules known under the trade designation 3M Brand "9300" Series Roofing Granules, all three available from Minnesota Mining and Manufacturing Company, St. Paul, Minn. ("3M").

Either precolored or "virgin" inorganic base granules may be colored with various pigments by including a pigment in the ceramic coating. Suitable pigments used in making the coated granular materials of the invention include red iron oxide, yellow iron oxide, titanium dioxide, chrome hydrate, chrome oxide, chrome green, ultramarine blue, phthalocyanine blue and green, carbon black, metal ferrites, and mixtures thereof.

The data provided in the Examples which follow show results of side-by-side comparison of base granules treated with a combination of oil/$AlCl_3$ with granular materials coated with compositions in accordance with the invention. The data show that a competent dust-reduction treatment is provided by the compositions of the present invention, while the amount of oil required is reduced. Typical dust levels for granules treated with 4 grams slate oil/silicone oil combination (3% by weight silicone oil) per kilogram of base granules (without tackifier) averaged about 300 particles of dust per cubic centimeter of air. The inventors herein have found that a loading of only about 0.15 grams tackifier, 4 grams oil, and 0.125 grams silicone oil per kilogram of base granules controlled dust level to about 30 particles per cubic centimeter.

The coated granular materials of the present invention typically and preferably exhibit wet and dry pick test values (as described in the Examples) very close to the values obtained when no tackifier is used. The water repellency of the inventive coated granular materials is also excellent.

The principles of the present invention may be applied to any non-coated or silicate-based ceramic coated granule, with no limitations as to color of the base granules.

Method of Making Ceramic-Coated Base granules Used in the Examples

The method of making ceramic-coated base granules is described in U.S. Pat. No. 2,981,636, col. 5, lines 69–75, bridging col. 6, lines 1–16.

First, a slurry is formed at room temperature (about 25° C.) comprising an aluminosilicate, such as kaolin, an alkali metal silicate, such as sodium silicate solution, and optionally other additives and pigments. This slurry is applied to base granules which are at a temperature ranging from about 150° C. to about 200° C., preferably about 180° C., in a mixer such as a tumbling-barrel type of mixer.

The granules and slurry are then mixed for several minutes until the granules are evenly coated with the slurry, and then the slurry-coated base granules are dried with warm air until they have a free flowing consistency.

The coated granules are then fired in a kiln, preferably a rotary kiln, at a temperature ranging from about 300° C. to about 550° C., more preferably from about 350° C. to about 500° C., for a time sufficient to react the silicate and aluminosilicate to form "kilned" granules.

The invention will be further described with reference to the following Test Methods and Examples. In the following Examples, all parts and percentages are by weight unless otherwise specified.

TEST METHODS

Dust Generation Measurement

Granular materials, when processed into roofing granules or other end products, may, and generally do have small particles associated with them (or generated from them) that are not chemically or physically bonded to the granules. The small particles, which may originate from either the coating or the base granules, easily become airborne during material handling procedures. "Airborne dust", for the purposes of this invention, is defined as any particle between 0.5 micrometer and 30 micrometers in diameter. This test quantified the dusting for samples of coated granular materials.

The testing equipment used to measure airborne dust contained in a sample of coated granular material consisted of a dust generation machine known under the trade designation "APS 3310" Aerodynamic Particle Sizer Analysis System and associated hardware and software, available from TSI, Inc., St. Paul, Minn. The system included a diluter known under the trade designation "APS 3302" which allowed reduction of the particle concentration with air. The diluter allowed a dilution ratio of 20:1 to be used, at a total flow rate of 5 standard liters per minute. The diluter operated in a closed system where a small sample of "air" from the sample was diluted with filtered air taken from the original sample. With the closed system, the integrity of the sample was upheld by maintaining the same temperature, relative humidity, and elemental composition throughout.

The machine was designed specifically to measure concentration of airborne dust particles using laser refraction. The sample granules and accompanying dust and dilution air fell through a laminar flow capillary tube (partially by gravity and partially under the influence of the particle size analyzer) which was placed below the sample inlet. Flowrate was monitored by the pressure drop across the capillary tube. Optical fibers opposed each other across the capillary tube, and when the laser beam was broken as the sample fell through, a signal was sent (through a signal processor known under the trade designation "Opto 22", from Optomux Corp.) to an International Business Machines Corporation computer known under the trade designation "PS/2 Model 50". The computer reported, using programmed software from TSI., Inc., concentration of particles in "particles/cc" of air. The optical fibers, laser, and associated equipment were available from Banner Engineering Corp.

In running a test, 200 grams of roofing granules to be tested were weighed and put into the dust generator. The dust generator then measured airborne dust particles for 25 seconds, and reported the total concentration of particles ranging in size from 0.5 to 30 micrometers.

In general, for non-white samples prepared or treated in the laboratory, dust levels are preferably below 100 particles/cc. In general, dusting values closer than 10 particles/cc, especially when the dusting values are under 10, are considered to be essentially the same.

Adhesion Tests (Dry and Wet Pick Tests)

The pick test is a practical test used in the roofing granule industry to predict the adhesive characteristics of roofing granules toward asphalt. Screened granules were dropped into hot asphalt and when the asphalt had cooled to about room temperature, the granules were picked out of the asphalt. The granule surface which had been in contact with the asphalt was observed for the amount of asphalt adhering to it. If the surface of the granule was well coated with asphalt, the granule had a good "dry" pick test value. Any reading above 60% coverage of the contact surface is considered satisfactory.

Effects of water upon adhesion were obtained by submerging the asphalt-granule combination under water for 18 hours. Afterwards, observation of the percent contact surface covered by asphalt was measured. Values above 30% are considered excellent and values above 10% are considered satisfactory.

I. Preparation (Screening) of Granules

Full grade granules were screened through a #14 screen (US mesh, which passed particles having size of 1.4 micrometers and smaller) and those granules which remained on the screen were used in the Examples and Test Methods.

II. Preparation of Asphalt

A coating asphalt obtained from a typical mid-continent (US) crude oil was used as purchased from Richards Asphalt Co., Savage, Minn. The asphalt was heated to 176° C. in a 4.4 liter can with a loose cover until the asphalt was fluid. Any skin which formed on the molten asphalt surface was removed before using. Narrow strips of the fluid asphalt were poured onto a release paper and cooled to room temperature. Charred asphalt was removed by picking it from the strips of cooled asphalt.

III. Pick Test Procedures 5 grams of prepared asphalt was placed in a can having approximate diameter of about 6 centimeters (cm). The asphalt and can were then placed in a dispatch oven at 176° C. for 10 minutes with full circulation of air. After 10 minutes the can was removed from the oven and tapped on a table top once to remove air bubbles. Granules to be tested were then sprinkled onto the top surface of the asphalt in the can from a height of 30.5 cm or more. The can was tapped on a table top three times to help embed the granules in the asphalt. The can, asphalt, and granules were then left undisturbed and allowed to cool to room temperature (approximately 0.5 hour).

The granules were first picked out of the cooled asphalt on a dry basis. Only those granules which were embedded well were examined. A picked granule was examined to estimate the amount of asphalt that was adhered to it. The estimate used a scale of 0–100, with "0" meaning no asphalt adhered to the granule and "100" meaning that the part of the granule embedded in the asphalt was completely covered. Ten granules were picked out of the asphalt for each of 3 different times (dry, 2 hours, and 18 hours) and their total recorded in percent.

For the wet pick test, the procedure was to submerge the granule-covered asphalt in the same can for two hours under 0.64 cm distilled water at room temperature. The granules were then re-evaluated. The experiment is repeated for an additional 16 hours, and the granules further re-evaluated.

When performing the pick test it was sometimes noted that the asphalt had a tendency to crack or break around the base of the granule. When this occurred, the test result was ignored. In some cases, especially when performing the wet pick tests, the can was held next to a microscope light for about 10 seconds (on the lid) and 12–13 seconds (on the bottom) to slightly warm the asphalt and prevent cracking.

Water Repellency Test

The water repellency is a quality control test frequently used in the roofing granule industry to measure a roofing granule's hydrophobicity. It is important to have hydrophobic roofing granules because hydrophilic granules exhibit difficulty in being adhered to an asphalt-based substrate. When roofing granules are applied to an asphalt-based substrate, water is sprayed on the asphalt to cool the heated substrate. If the roofing granules are hydrophilic, water can be present between the granules and the substrate, thereby hindering granule adherence to the asphalt-based substrate.

Water repellency was measured by placing three drops of distilled water from an eye dropper onto a 25 gram pile of roofing granules. The drops were placed in a depression that had been made in the center of the pile of granules. The three drops of distilled water formed a bead in the depression. A measurement was taken for the time taken for the bead to break up and sink down through the granules. Longer times indicate better hydrophobicity.

4-Day Stain Test

The stain test is another quality control test frequently used in the roofing granule industry. The 4-day stain test was an accelerated measurement of the tendency of roofing granules to adsorb asphaltic oils in an asphalt-based substrate. The granules of each sample were embedded in asphalt that had been heated to 365° F. (63° C.). The embedded granules were placed on a tray in an oven at 176° F. (80° C.) for 96 hours (4 days). The trays were removed from the oven, and the asphalt was allowed to cool to room temperature. The granules were then measured for staining under a LabScan colorimeter, and a staining value was calculated. Stain values range from 0 to 10, with 0 representing no stain (ideal) and 10 representing a dark brown or completely-oiled granule (which is unacceptable).

MATERIALS DESCRIPTION

The following materials were used in the Examples which follow:

"Tegosivin HL15M7" is an organosiloxane silicone oil, available from Goldschmidt Chemical, Hopewell, Va.;

"HS-500" is the trade designation for a light-colored naphthenic oil available from Cross Oil & Refining Co. Inc., Smackover, Ark.

tackified "HS-500" is the designation used herein for a composition consisting of an organic material which is the terpolymer of ethene, 1-propene, and 1,4-hexadiene dispersed in "HS-500"; tackified "HS-500" is available from Cross Oil & Refining Co. Inc., Smackover, Ark.;

3M Brand "9300" Series Roofing Granules, white kiln product, available from 3M Industrial Mineral Products Division Pilot Plant, St. Paul, Minn.

Procedure for Treating Granules to Reduce Dust Generation

The procedure used in the following Examples for synthesizing the coated coated granular materials of the invention and the Comparative Examples was as follows:

1) ceramic-coated white kilned granules prepared as above-described were measured into 500 gram samples;
2) each 500 gram sample was heated in an oven in an air atmosphere to 182° C. and held at that temperature for at least 2 hours;
3) the heated samples were removed from the oven and immediately placed in a mechanical shaker (one gallon paint can shaker), which was then turned on;
4) after i minute of shaking, post-treatment oil compositions were added to sample immediately;
5) the treated granules were allowed to shake for a total of exactly 4 minutes; and
6) samples were removed from the shaker, boxed, and allowed to cool overnight.

EXAMPLES

Example 1 and Comparative Example A

Granules of Example 1 and Comparative Example A were treated by the Procedure for Treating Granules to Reduce Dust Generation described above using white kiln 3M Brand "9300" Series Roofing Granules as the substrate granules.

A composition within the invention was first prepared. A tackifier (tackified "HS-500") was first dispersed into slate oil, and then a silicone oil was dispersed into the tackifier/oil dispersion.

White kiln granules then had applied thereto the composition which resulted in the granules having 4 grams slate oil, 0.15 gram tackifier, and 0.125 gram silicone oil known under the trade designation "Tegosivin" HL15M7 per kilogram of white kiln granules.

The granules of Comparative Example A were coated with a composition identical in all respects to that used to coat the granules of Example 1, except that the tackifier was omitted.

The coated granules of Example 1 and Comparative Example A were then subjected to dust generation, dry and wet pick, water repellency, and 4-day stain tests. The results of the tests are presented in Table 3.

TABLE 3*

| | Example 1 | Comp. Ex. A |
|---|---|---|
| dust count (particles/cc) | 29 | 310 |
| dry pick (%) | 72 | 69 |
| wet pick (%) | 53 | 44 |
| water repellency (time) | 1 hr + | 1 hr + |
| stain (dimensionless) | 5 | 3.5 |

*Average of six runs

As can be seen from the data in Table 3, the granules of Example 1 coated with the composition of the invention significantly lowered the amount of dust generated, had only slightly lower dry and wet values, similar water repellency value, and a much lower stain value.

Examples 2–11

Affect of Location of Addition of Tackified Oil on Dust Generation

To test the location-dependence of the reduction in dust generated from ceramic-coated base granules, white kiln 3M Brand "9300" Series Roofing Granules were treated with the composition of the invention in a production facility. Table 4 lists the location of addition of each composition, and the ingredients in each.

TABLE 4

| Example | Tackifier Level (wt %) | Cooler Oil[1] (gm/kg) | Belt Oil[2] (gm/kg) | Dust Generation Value[3] |
|---|---|---|---|---|
| 2 | 0.2 | 4 | 0 | 56 |
| 3 | 0.2 | 4 | 2 | 21 |
| 4 | 1.0 | 2 | 2 | 79 |
| 5 | 0.2 | 2 | 0 | 274 |
| 6 | 1.0 | 4 | 2 | 10 |
| 7 | 0.2 | 2 | 2 | 92 |
| 8 | 1.0 | 2 | 0 | 279 |
| 9 | 0.6 | 3 | 1 | 46 |
| 10 | 1.0 | 4 | 0 | 33 |
| 11 | 0.6 | 3 | 1 | 37 |

[1]Oil applied at the cooler
[2]Oil applied at the belt
[3]particles per cubic centimeter A composition within the invention was first prepared. A tackifier (tackified "HS-500") was dispersed into slate oil to form the composition of the invention which was to be applied to the granules. No silicone oil was added to the oil in these tests.

White kiln granules exited a rotating kiln at a temperature of about 480° C. and fell by gravity onto a chute at an angle of about 45°, which directed the granules into a substantially horizontal (angle to horizontal about 20°) rotating cooler. The cooler was essentially a hollow cylinder having an entrance and an exit for the granules, and which had cooling water flowing through an annular space created by internal and external surfaces. The granules exited the cooler at a temperature of about 110° C.

In Table 4, "oil applied at the cooler" means that oil was applied to the granules via a pipe extending approximately one fifth the length of the cooler and into the cooler granule exit, and along the longitudinal axis of the cooler. After the granules exited the rotating cooler they fell by gravity into a chute at an angle of about 60°, which directed the granules onto a screening device. After the granules exited the screeninfg device they fell by gravity into a chute into a chute at an angle of about 60°, and then fell onto a conveyer belt which was at an angle to horizontal of about 35°. In Table 4, "oil applied to the belt" means that oil was applied to the granules after they had fallen onto the second horizontal belt. At this point, the granules had reached a temperature ranging from about 65° C. to about 95° C., depending on the degree of cooling achieved in the cooler. A typical temperature of the granules at this point was about 80° C. The granules then dropped off of the second moving horizontal belt into a holding tank.

The dust generation values as measured by the method described above were generated from samples of granules from each of the runs of Examples 2–11 (i.e., granules taken from the holding tank after each run). As can be seen from the data, the location of addition of the composition of the invention significantly affected the dust reduction property of the composition. Dust reduction appeared to be optimized using the conditions of Examples 4 and 6.

Various modifications and alterations of this invention will become apparent to those skilled in the art without departing from the scope of this invention, and it should be understood that this invention is not to be unduly limited to the illustrated embodiments set forth herein.

What is claimed is:

1. A coatable composition suitable for reducing dust generation during processing of granular materials, the composition consisting essentially of:

a) an organic oil;

b) an optional adhesion agent; and c) a tackifier consisting essentially of an organic material having a glass transition temperature of no less than about 120° C. and a naphthenic oil present in sufficient amount to give the tackifier a kinematic viscosity ranging from about 3,000 to about 5,000 centistokes at 100° C.; said organic oil being compatible with the tackifier and the optional adhesion agent.

2. Composition in accordance with claim 1 wherein the tackifier is present in the composition at about 0.5 to about 2.0 weight percent of the total weight of the composition, and the adhesion agent is present in the composition at about 0.5 to about 5.0 weight percent of the total weight of the composition oil.

3. Composition in accordance with claim 1 wherein the tackifier is present at about 0.5 to about 1.0 weight percent of the total weight of the composition.

4. Composition in accordance with claim 1 wherein the organic oil is a mineral oil selected from the group consisting of slate oil, rock oil, coal oil, and seneca oil.

5. Composition in accordance with claim 1 wherein the organic oil is slate oil.

6. Composition in accordance with claim 1 wherein the organic material has a glass transition temperature no less than about 150° C.

7. Composition in accordance with claim 1 wherein the organic material is selected from the group consisting of polyalkylene resins and polycycloalkene resins.

8. Composition in accordance with claim 7 wherein the polyalkylene resin is selected from the group consisting of polybutene resins, dipentene resins, and terpolymers of ethene, 1-propene, and 1,4-hexadiene.

9. Composition in accordance with claim 8 wherein the polyalkylene resin is the terpolymer of ethene, 1-propene, and 1,4-hexadiene, the diluent is a light-colored naphthenic oil, and the adhesion agent is a silicone oil.

10. Composition in accordance with claim 7 wherein the polycycloalkene resin is selected from the group consisting of phenol-aldehyde resins, terpene resins, rosins, polyethylene rosin esters, phenolic polyterpene resins, limonene resins, and pinene resins.

11. A method of reducing dust generation during processing of granular materials, said granular materials comprising base granules, the method comprising applying to the base granules a coatable composition, wherein the coatable composition consists essentially of:

a) an organic oil;

b) an optional adhesion agent; and c) a tackifier consisting essentially of an organic material having a glass transition temperature of no less than about 120° C. and a napthenic oil present in sufficient amount to give the tackifier a kinematic viscosity ranging from about 3,000 to about 5,000 centistokes at 100° C.; said organic oil being compatible with the base granules, the tackifier, and the optional adhesion agent.

12. Method in accordance with claim 11 wherein the granular material is heated in a kiln to form kiln-fired granular material and subsequently cooled in a means for cooling to yield cooled granular materials, and the composition is applied to the kiln-fired granular material while the kiln-fired granular material passes through the means for cooling.

13. Method in accordance with claim 12 wherein the composition is also applied to the cooled granular material during transport of the cooled granular material.

14. Method in accordance with claim 11 wherein said composition includes a silicone oil in an amount ranging from about 0.5 to about 5.0 weight percent of the total weight of the coating.

15. A method of making organic oil-coated granular materials comprising the steps of:

a) providing at least one base granule;

b) coating the at least one base granule with a coatable composition in a coating weight ranging from about 0.5 to about 10 grams per kilogram of base granules, wherein the coatable composition consists essentially of:

(i) an organic oil;

(ii) an optional adhesion agent; and (iii) a tackifier consisting essentially of an organic material having a glass transition temperature of no less than about 120° C. and a naphthenic oil present in sufficient amount to give the tackifier a kinematic viscosity ranging from about 3,000 to about 5,000 centistokes at 100° C.; said organic oil being compatible with the base granules, the tackifier, and the optional adhesion agent.

16. Method in accordance with claim 15 wherein said composition is devoid of said adhesion agent.

\* \* \* \* \*

UNITED STATES PATENT AND TRADEMARK OFFICE
CERTIFICATE OF CORRECTION

PATENT NO. : 5,484,477
DATED : January 16, 1996
INVENTOR(S) : George et al.

It is certified that error appears in the above-identified patent and that said Letters Patent is hereby corrected as shown below:

Col. 7, line 61, "(2.5 x $10^{-1}$" should be -- (2.5 x $10^{-3}$ --.

Col. 8, line 2, "base" should be --inorganic--.

Col. 8, line 42, "base" should be --inorganic--.

Col. 12, line 6, "4 -day" should be -- 4-day--.

Col. 12, line 43, "coated coated" should be --coated--.

Signed and Sealed this

Twenty-fifth Day of November, 1997

Attest:

BRUCE LEHMAN

*Attesting Officer*  *Commissioner of Patents and Trademarks*